United States Patent [19]

Houlachi et al.

[11] Patent Number: 5,200,042

[45] Date of Patent: Apr. 6, 1993

[54] PROCESS TO RECOVER PURE COPPER DURING PURIFICATION OF ZINC SULFATE SOLUTION

[75] Inventors: George Houlachi, Kirkland; Carole Allen, Pierrefonds; Francis Bélanger, Montreal, all of Canada

[73] Assignee: Noranda Inc., Toronto, Canada

[21] Appl. No.: 712,537

[22] Filed: Jun. 10, 1991

[30] Foreign Application Priority Data

Jun. 8, 1990 [CA] Canada .................................. 2018635

[51] Int. Cl.⁵ .............................................. C25C 1/12
[52] U.S. Cl. ................................... 204/106; 204/108; 423/41; 423/98; 423/106; 423/109; 423/111; 423/140; 75/326; 75/738
[58] Field of Search .................. 204/106, 108; 423/41, 423/98, 106, 109, 111, 140; 75/326, 738

[56] References Cited

U.S. PATENT DOCUMENTS 4,093,526 6/1978 Blanco et al. .................... 204/108

FOREIGN PATENT DOCUMENTS 1046288 1/1979 Canada .

Primary Examiner—John Niebling
Assistant Examiner—David G. Ryser
Attorney, Agent, or Firm—Keck, Mahin & Cate

[57] ABSTRACT

A process for recovery of copper from a copper residue obtained during purification of a zinc sulfate solution comprises leaching the copper residue in a concentrated sulfuric acid solution in the presence of an oxidant at a temperature of between 60° and 80° C. and separating the solids from the leach solution, electrowinning copper from the leach solution, returning the electrolyte solution to the initial leaching stage to initiate dissolution of the copper residue, and bleeding a portion of the electrolyte solution to reduce the concentration of impurities in the solution.

7 Claims, 4 Drawing Sheets

PROCESS TO RECOVER PURE COPPER DURING PURIFICATION OF ZINC SULFATE SOLUTION

This invention relates to a process to recover pure copper during purification of zinc sulfate solution.

In zinc plant operations, the zinc concentrate is normally roasted and the calcine subsequently leached with sulfuric acid. The zinc sulfate solution so produced is first purified by oxidation and hydrolysis to eliminate iron and other hydrolysable impurities, and further treated to eliminate impurities, such as copper, cadmium and cobalt, prior to being subjected to electrolysis for recovering zinc. Purification of the zinc sulfate solution to remove copper, cadmium and cobalt ions is generally effected by cementation on zinc dust. A detailed description of one such purification process is found in Canadian Patent 1,046,288 issued Jan. 16, 1971. In the above purification process, copper is generally recovered as a residue containing about 50% Cu, 5% Cd and 15% Zn. This residue is normally sold to copper smelters. Due to the low purity of this product, significant losses of cadmium and zinc are encountered. More importantly, the high quantities of cadmium found in the copper residue often presented a health hazard which prevented the copper residue from being sold.

It is therefore the object of the present invention to provide a process for recovering pure copper from the copper residue obtained during purification of the zinc sulfate solution prior to electrolysis of such solution for recovering zinc.

The process in accordance with the present invention comprises leaching the copper residue obtained during purification of zinc sulfate solution in a concentrated sulfuric acid solution in the presence of an oxidant at a temperature between 60° and 90° C. and separating the solid residue from the leach solution, electrowinning copper from the leach solution, returning the electrolyte solution to the initial leaching stage to initiate dissolution of new copper residue, and bleeding a portion of the electrolyte solution to reduce the concentration of impurities in the solution.

Purification of the zinc sulfate solution is normally done in at least two stages using zinc dust and an antimony compound. Copper and cadmium are removed in the first stage and cobalt in the second stage. The copper and cadmium removed in the first stage are passed through a vacuum filter, such as a Dorrco filter to produce a purification zinc residue called Dorrco cake. The Dorrco cake is leached with sulfuric acid and passe through a filter press to produce the above copper residue containing about 50% Cu, 5% Cd and 15% Zn, and a filtrate for further treatment. The above copper residue also contains minor amounts of nickel and cobalt. As it is well known, nickel interferes with the recovery of cadmium as a sponge and cobalt is detrimental to electrolysis of zinc. To remove the above impurities, at least 25% of the copper residue is mixed with the filtrate from the above mentioned filter press and treated with zinc dust at a temperature of about 95° C. and a pH adjusted to about pH 4 by the addition of purification zinc residue, to form a zinc cement containing nickel. The zinc cement is then leached with water at 70° C. to solubilize nickel and part of cobalt which are subsequently eliminated by neutralisation and disposal. The solids are recycled to the copper residue leaching stage. The liquid phase from the cementation stage is treated with $KMnO_4$ to precipitate the remaining Co, Tl and Pb impurities and filtered to remove such impurities. The filtered liquid is further treated to recover cadmium.

The invention will now be disclosed, by way of example, with reference to the accompanying drawings in which.

Figure 1:
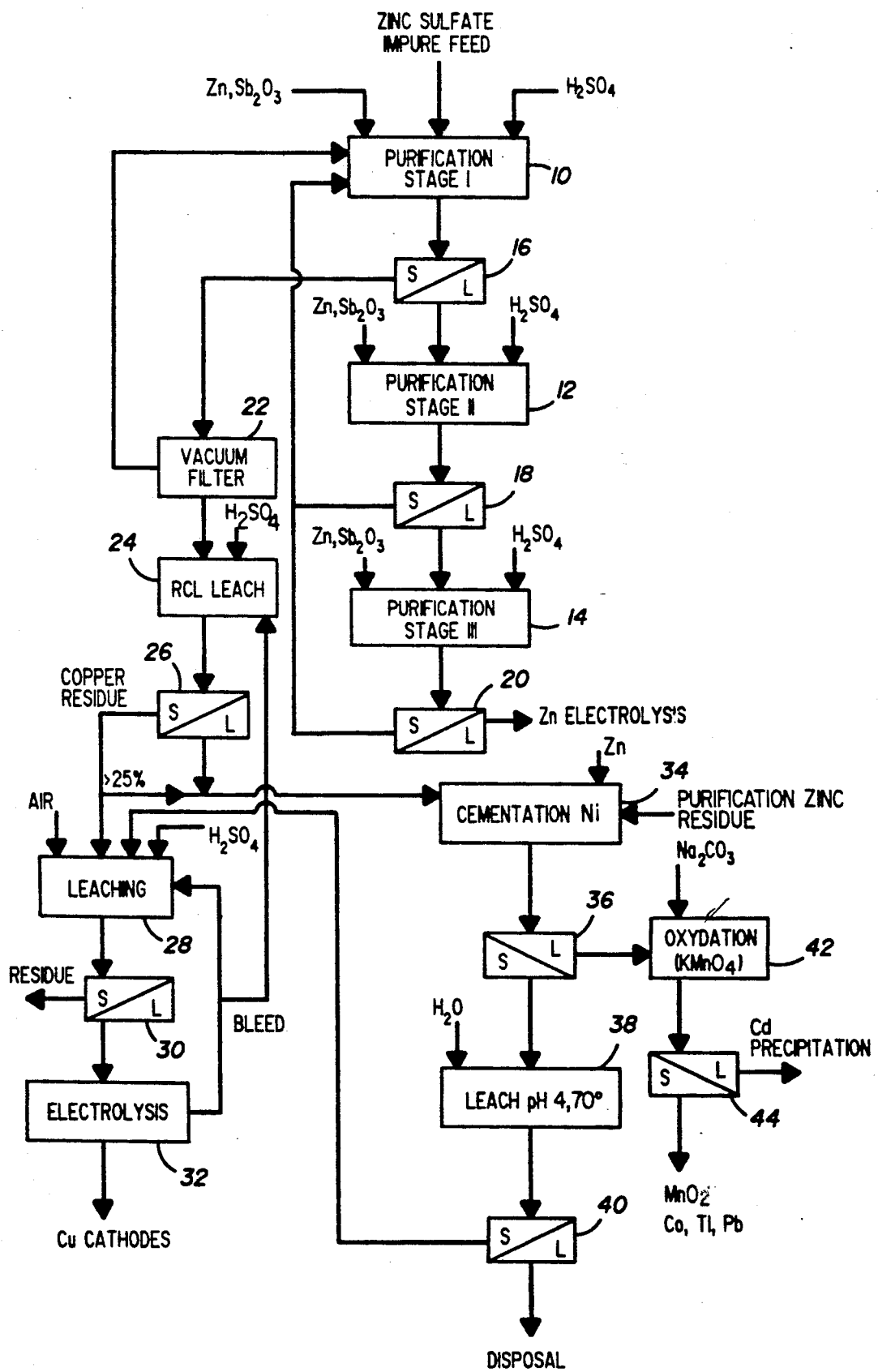
FIG. 1 is a flowsheet of the process in accordance with the present invention.

Referring to FIG. 1 of the drawings, the impure zinc sulfate solution containing Cu, Cd and Co as major impurities is treated in known manner in a purification circuit comprising three stages 10, 12 and 14. Zinc dust and an antimony compound are added to the three purification stages to cement the impurities. As the process proceeds, zinc dust and the antimony compound in the first stage are replaced by the cement cake from the following stages. Generally speaking, Cu and Cd are cemented in the first stage and the cement cake removed in solid-liquid separation stage 16 whereas cobalt is cemented in the second stage and removed in solid-liquid separation stage 18. The liquid phase from the last purification stage 20 is sent to electrolysis for Zn recovery. $H_2SO_4$ may be added to each purification stage for pH control. A full description of the above purification circuit may be found in the above identified Canadian Patent 1,046,288.

The copper cake extracted from the first solid-liquid separation stage is passed in known manner through a vacuum drum filter 22, such as the Dorrco filter, and leached with $H_2SO_4$ in a so-called return cake leach (RCL) stage 24. The leach solution is then passed through a conventional solid-liquid separation stage 26, such as a filter-press. The solids are normally sent to a copper smelter for copper recovery whereas the filtrate is further treated for cadmium recovery.

Figure 2:
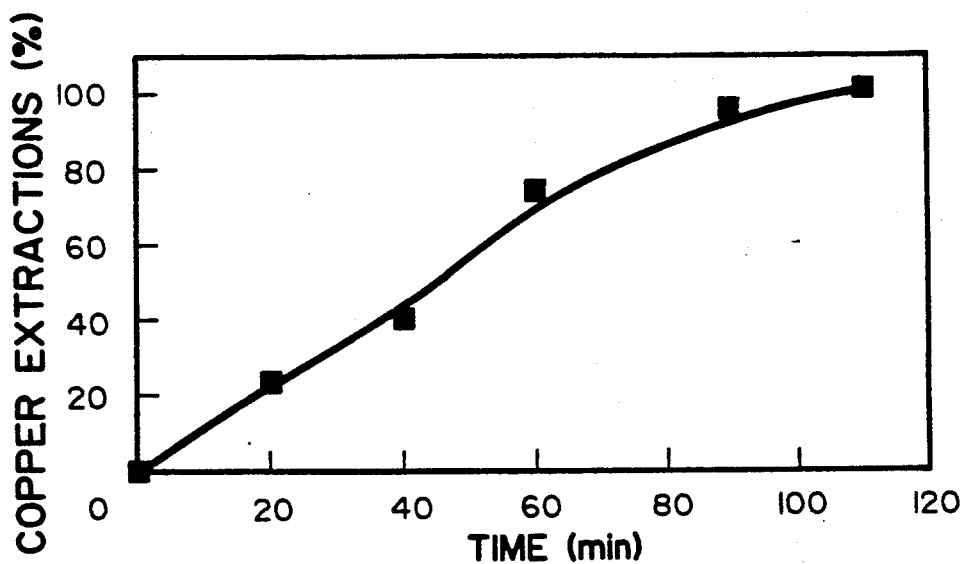
FIG. 2 is a diagram illustrating leaching of copper contained in the copper residue.

The copper residue which is normally sold to copper smelters contains about 50% Cu, 5% Cd and 15% Zn. Due to its low purity, significant losses of cadmium and zinc are therefore encountered. To overcome the above problem, applicant has designed a new circuit for copper recovery in a pure form. In accordance with the present invention, such copper residue is dissolved with sulfuric acid at a solution temperature between 60° and 80° C. in leaching stage 28. Air is sparged during leaching to enhance the dissolution of the residue. FIG. 2 shows that the copper residue may be completely dissolved in about two hours at a temperature of 70° C. and a solid concentration of 100 g/L. The leach solution is then passed through a solid-liquid separation stage 30 and the filtrate sent to electrolysis cells 32 to electrowin copper. After the copper is electrowon, the filtrate is returned to the initial leaching stage where dissolution of a new copper residue commences. As the concentration of impurities in the leaching solution increases, a portion of the electrolyte is bled for controlling the level of these elements. The bleed solution is preferably returned to RCL stage 24.

Figure 3:
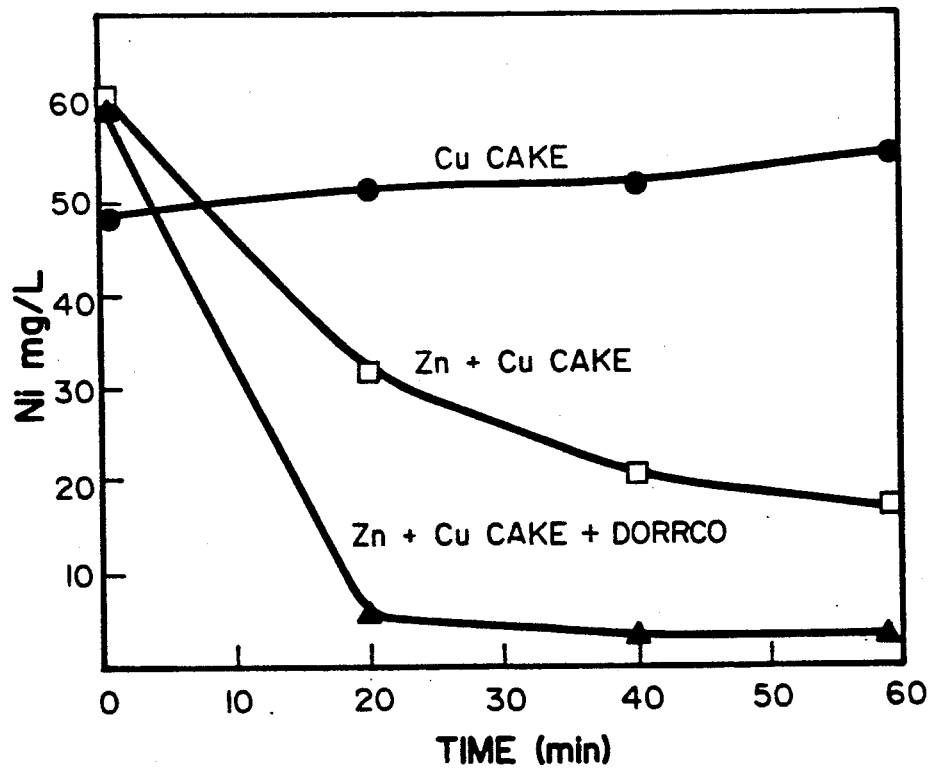
FIG. 3 is a diagram illustrating cementation of nickel present in the copper residue.

A minor amount of nickel and cobalt impurities normally present in the copper cake are no longer physically removed from the circuit. As it is well known, nickel interferes with the recovery of cadmium as a sponge and cobalt is detrimental to electrolysis of zinc. Applicant has further designed a circuit whereby the above impurities may be reduced below acceptable levels. In accordance with a second feature of the present invention, a portion of the copper residue varying from a minimum of 25% to a maximum of 100% depending on the mode of operation, is mixed with the filtrate from the RCL leach 24 and treated with zinc dust in a cementation stage 34 at a temperature of about 95° C. and a pH adjusted to about pH 4 by the addition of purification zinc residue. FIG. 3 shows that the nickel content of a solution containing about 60 mg/L Ni can be reduced to 2 mg/L in about 60 min by the addition of 1 g/L zinc dust in presence of copper and purification zinc residue. The cement from stage 34 is filtered in a solid-liquid separation stage 36. The results shown in FIG. 3 indicate that the nickel cementation is adequate (residual Ni<5 mg/L) only when it is done in the presence of solids from the purification zinc residue (Dorrco cake). The residual Ni concentration of less than 5 mg/L is required for obtaining an acceptable cadmium sponge in the subsequent treatment of the solution. The solids are leached with water at about 70° C. in leach stage 38. This allows extraction of nickel and cobalt as shown in the following Table:

TABLE 1

| Time (min) | Co mg/L | Ni mg/L |
|---|---|---|
| 0 | 240 | 21.2 |
| 30 | 660 | 49.5 |
| 60 | 930 | 74.7 |
| 90 | 880 | 85 |
| 120 | 920 | 85 |
| 150 | 880 | 85 |
| 180 | 840 | 86.2 |

The leach solution is then subjected to a solid-liquid separation stage 40. The solids are returned to the copper residue leaching stage 28 whereas the liquid phase containing nickel and part of the cobalt is disposed of after neutralisation.

Figure 4:
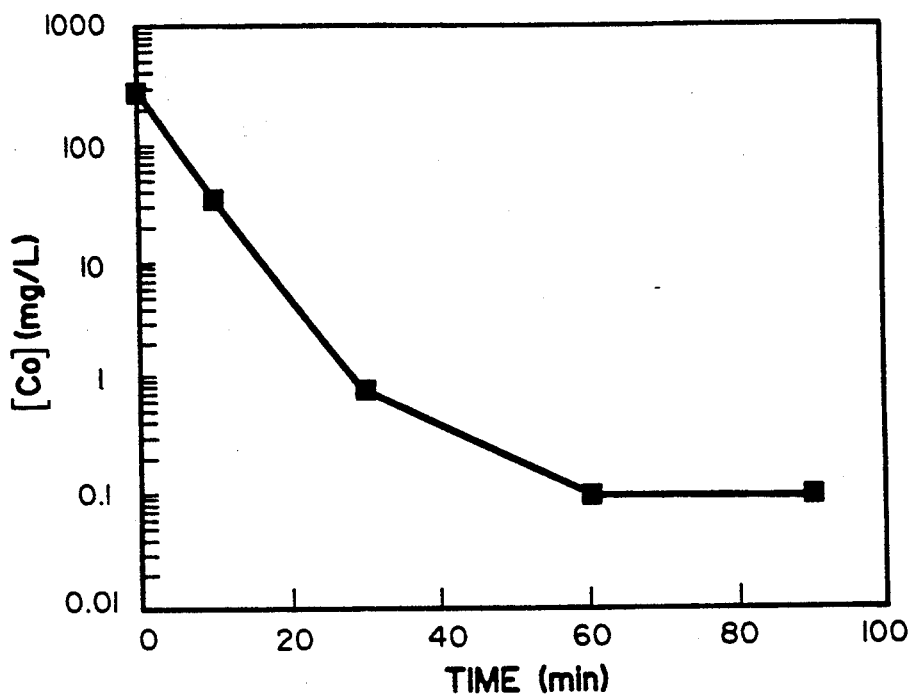
FIGS. 4, 5 and 6 are diagrams illustrating oxidation of Co, Tl and Pb with $KMnO_4$.
Figure 5:
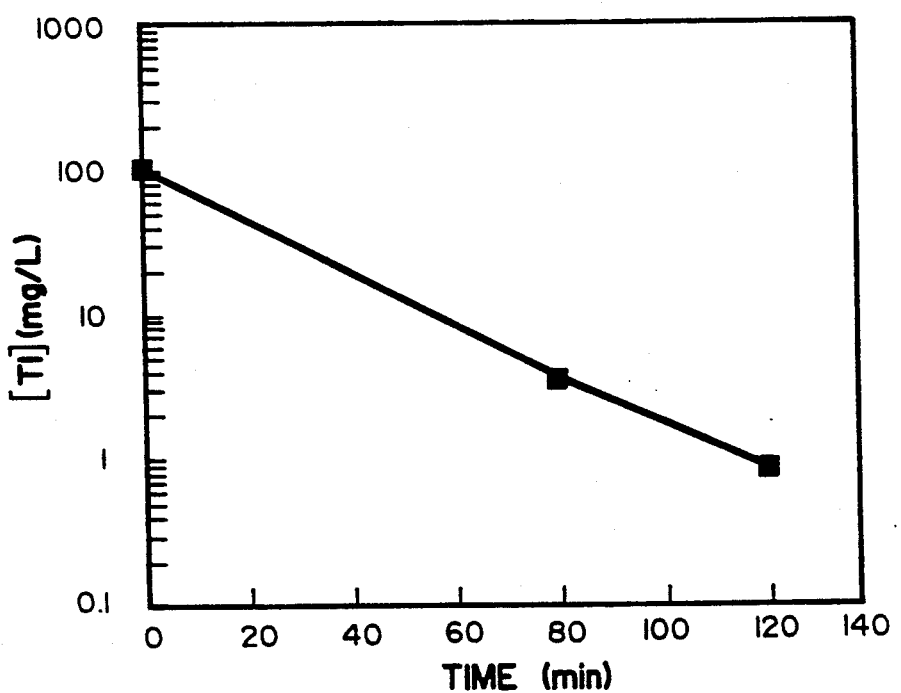
Figure 6:
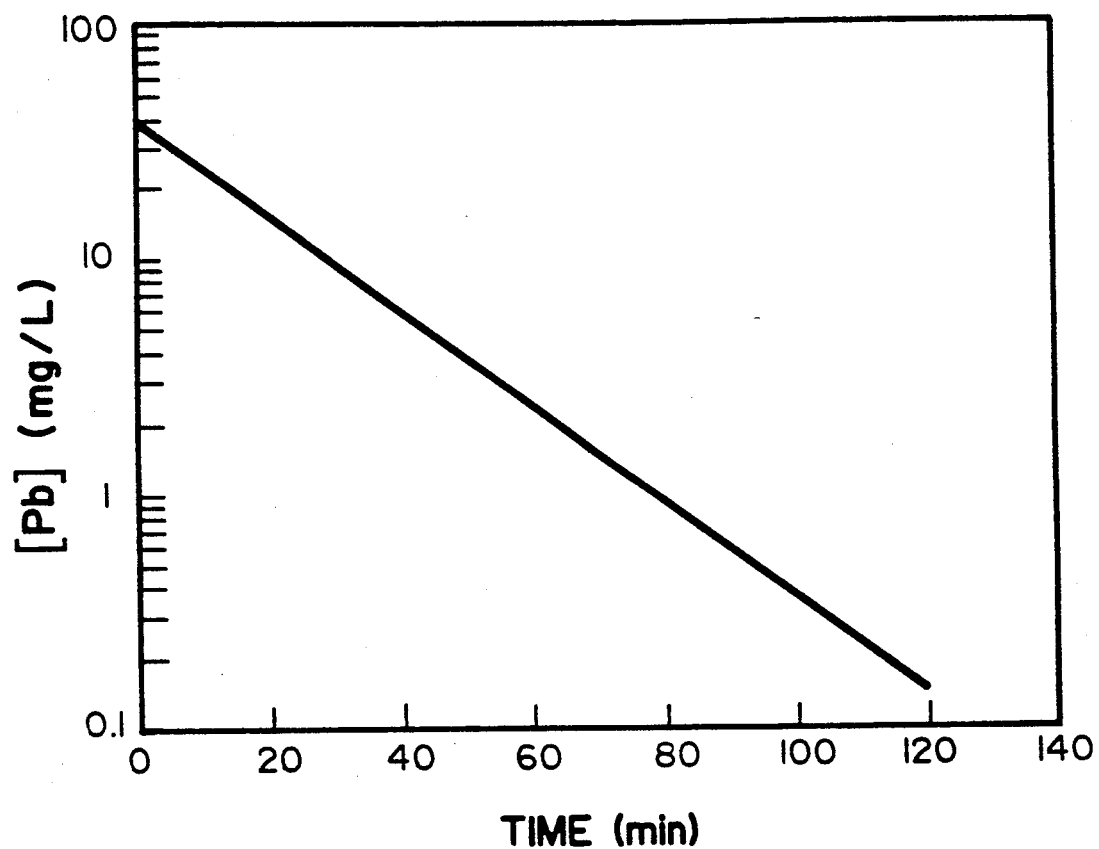

The liquid phase from the solid-liquid separation stage 36 is fed to oxidation stage 42 where it is reacted with a 1.5 stoichiometric addition of $KMnO_4$ at about 95° C. and pH 4 to precipitate Co, Tl and Pb impurities as shown in FIGS. 4, 5 and 6. The solution is then subjected to a solid-liquid separation stage 44 to remove the solids containing $MnO_2$, Co, Tl and Pb. The liquid phase contains cadmium which may be recovered using conventional technology such as by cementation using special high grade zinc dust or by electrolysis.

Although the invention has been disclosed with reference to a preferred embodiment, it is to be understood that it is not limited to such embodiment and that other alternatives are also envisaged within the scope of the following claims.

We claim:

1. Process for recovery of copper from a copper residue obtained during purification of a zinc sulfate solution and containing about 50% copper and minor amounts of cadmium and zinc, said process comprising:

a) atmospheric leaching the copper residue in a concentrated sulfuric acid solution in the presence of an oxidant at a temperature of between 60° and 80° C. to produce a leach solution and separating the solids from the leach solution;

b) electrowinning copper from the leach solution to produce an electrowon solution;

c) returning the electrowon solution to the initial leaching stage (a) to initiate dissolution of the copper residue; and d) bleeding a portion of the electrowon solution to reduce the concentration of impurities in the solution.

2. Process as defined in claim 1, wherein purification of the zinc sulfate solution is done in at least a first stage and a second stage, wherein in the first stage the zinc sulfate solution is treated with the zinc dust and an antimony compound to form a cement containing essentially copper and cadmium, and separating said cement from such partially purified solution, and wherein in the second stage the partially purified solution is treated with zinc dust and an antimony compound to form a cement containing essentially cobalt, and separating said cement from the purified solution.

3. Process as defined in claim 2, wherein the major portion of the cement from the second stage is recycled to the first stage to be used therein instead of zinc dust for the treatment of the zinc sulfate solution.

4. Process as defined in claim 2, wherein the cement from the first stage is filtered in vacuum drum filters to remove the solids from the filtrate, and the solids leached with sulfuric acid and passed through a filter press to produce said copper residue and a filtrate containing cadmium for further treatment.

5. Process as defined in claim 4, wherein a minor amount of nickel is present in the copper residue and wherein at least 25% of said copper residue is mixed with said filtrate at a temperature of about 95° C. and treated with zinc dust to which purification zinc residue is added to adjust the pH to about pH 4 to cement the nickel.

6. Process as defined in claim 5, wherein said cement is washed with water at 70° C. to solubilize nickel and part of the cobalt which are subsequently eliminated by neutralization and disposal and wherein the residue obtained after washing is recycled back to the initial leaching stage (a).

7. Process as defined in claim 5, wherein the liquid phase from the cementation stage is treated with $KMnO_4$ at about 95° C. to precipitate Co, Tl, and Pb impurities and filtered, and wherein the filtered liquid is further treated to recover cadmium.

* * * * *